United States Patent
Le Roux et al.

(10) Patent No.: US 12,365,623 B2
(45) Date of Patent: *Jul. 22, 2025

(54) 3D PRINTABLE CEMENTITIOUS INK INCLUDING ELECTROMAGNETIC PULSE RESISTANT BINDERS

(71) Applicant: ICON Technology, Inc., Austin, TX (US)

(72) Inventors: Alexander Le Roux, Austin, TX (US); Theodore Richard Cera, Austin, TX (US); J. Cole Sargent, Austin, TX (US); Aida Margarita Ley Hernandez, Austin, TX (US); Daniel Galvez Moreno, Austin, TX (US); Kunal Kupwade-Patil, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,352

(22) Filed: Feb. 23, 2024

(65) Prior Publication Data
US 2025/0026684 A1    Jan. 23, 2025

Related U.S. Application Data

(62) Division of application No. 17/369,618, filed on Jul. 7, 2021, now Pat. No. 12,017,954.

(Continued)

(51) Int. Cl.
*C04B 14/30* (2006.01)
*B28B 1/00* (2006.01)
(Continued)

(52) U.S. Cl.
CPC ............ *C04B 14/308* (2013.01); *B28B 1/001* (2013.01); *B33Y 10/00* (2014.12); *B33Y 70/00* (2014.12);
(Continued)

(58) Field of Classification Search
CPC ... C04B 14/308; C04B 14/024; C04B 14/026; C04B 14/06; C04B 14/28; C04B 28/04;
(Continued)

(56) References Cited

U.S. PATENT DOCUMENTS

2018/0334407 A1* 11/2018 Fulton ................. C04B 40/0046
2020/0123056 A1* 4/2020 Würmli ................... C04B 14/06
(Continued)

FOREIGN PATENT DOCUMENTS

PL          229764 B1 *  8/2018

OTHER PUBLICATIONS

Wang, Dehui, et al. "A review on effects of limestone powder on the properties of concrete." Construction and Building Materials, vol. 192, 2018, pp. 153-166, https://doi.org/10.1016/j.conbuildmat.2018.10.119. (Year: 2018).*

(Continued)

*Primary Examiner* — Jennifer A Smith
*Assistant Examiner* — Jeffrey Eugene Barzach
(74) *Attorney, Agent, or Firm* — KOKKA & BACKUS, PC

(57) ABSTRACT

An electromagnetic interference (EMI) resistant cementitious ink comprising a hydraulic cement, calcium carbonate, silica sand, taconite material, and a conductive material. A ratio of the silica sand to the taconite material is 1:1. In some embodiments, the taconite material includes taconite powder and fine taconite aggregate having a ratio of 1:1. In some embodiments, the conductive material includes carbon-based nanoparticles in solution. In further embodiments, the EMI-resistant cementitious ink has a shielding effectiveness in accordance with ASTM D4935-18 of at least 4.0 dB.

6 Claims, 7 Drawing Sheets

Related U.S. Application Data

(60) Provisional application No. 63/077,312, filed on Sep. 11, 2020.

(51) Int. Cl.
  *B33Y 10/00* (2015.01)
  *B33Y 70/00* (2020.01)
  *C04B 14/02* (2006.01)
  *C04B 14/06* (2006.01)
  *C04B 14/28* (2006.01)
  *C04B 28/04* (2006.01)
  *C04B 40/00* (2006.01)
  *C04B 111/00* (2006.01)
  *C04B 111/94* (2006.01)

(52) U.S. Cl.
  CPC .......... *C04B 14/024* (2013.01); *C04B 14/026* (2013.01); *C04B 14/06* (2013.01); *C04B 14/28* (2013.01); *C04B 28/04* (2013.01); *C04B 40/0042* (2013.01); *C04B 2111/00146* (2013.01); *C04B 2111/00181* (2013.01); *C04B 2111/00258* (2013.01); *C04B 2111/94* (2013.01)

(58) Field of Classification Search
  CPC ....... C04B 40/0042; C04B 2111/00146; C04B 2111/00181; C04B 2111/00258; C04B 2111/94; C04B 28/02; B28B 1/001; B33Y 10/00; B33Y 70/00; B33Y 30/00; B33Y 70/10; E04G 21/0463
  See application file for complete search history.

(56) References Cited

U.S. PATENT DOCUMENTS

2020/0176977 A1\* 6/2020 Nguyen ................. H02H 9/005
2020/0262753 A1\* 8/2020 Ceylan ................... C04B 28/04

OTHER PUBLICATIONS

English machine translation of PL-229764-B1 (Year: 2018).\*

\* cited by examiner

3D PRINTABLE CEMENTITIOUS INK INCLUDING ELECTROMAGNETIC PULSE RESISTANT BINDERS

CROSS-REFERENCE TO RELATED APPLICATIONS

This nonprovisional patent application is a divisional application of copending U.S. patent application Ser. No. 17/369,618, filed Jul. 7, 2021 and titled, "3D PRINTABLE CEMENTITIOUS INK INCLUDING ELECTROMAGNETIC PULSE RESISTANT BINDERS," U.S. patent application Ser. No. 17/369,618 claims the benefit of U.S. Provisional Patent Application No. 63/077,312, filed Nov. 11, 2020 and titled, "3D PRINTABLE CEMENTITIOUS INK INCLUDING ELECTROMAGNETIC PULSE RESISTANT BINDERS," each of which is herein incorporated by reference in their entirety for all purposes.

BACKGROUND

The present subject matter relates generally to a mortar that provides effective shielding against electromagnetic pulse (EMP) waves. More specifically, the present invention relates to a 3D printable cementitious ink that includes binder mixtures having conductive and absorptive surfaces for use in shielding against EMP waves.

Cementitious materials and other forms of concrete have played an integral role in the construction of any large-scale building. In a typical use case, cement is initially mixed off-site (e.g., away from the construction project) and then transported via truck or other means to the construction site. Alternatively, cement may be mixed on-site and the mortar or concrete is pumped up to a desired floor for delivery. Once at the site, the truck delivers, or pours, the mortar or concrete at a desired location. From there, skilled laborers smooth and shape the mortar or concrete, and allow it to set or harden.

Three dimensional (3D) printing of Portland cement-based mortar uses specialized equipment to deposit a mortar layer at a specific location using a degree of precision, oftentimes on top of a previously deposited cement layer. 3D printing of cementitious ink allows for easy addition of components to and variation within the deposition, within the layering as well as the shaping of the layering, allowing for the use of processes that would be difficult to implement in a conventional construction process. For example, 3D printing allows for the introduction of complex variabilities within the layering. 3D printing also allows for producing structures with complex geometrical shapes.

Within the construction of structures, the materials used to create the structures may be selected for specific uses. One such use is the protection of equipment and materials to be housed within the structure by selecting components that are resistant to EMP waves. EMP waves are a short-duration pulse of energy that may be caused by lightning as well as nuclear explosions or non-nuclear EMP weapons.

Accordingly, there is a need for a cementitious ink for use with 3D printing technology to construct a building that is resistant to EMP waves.

SUMMARY

To meet the needs noted above and others, the present disclosure provides cementitious inks having binder mixtures including conductive and absorptive surfaces to provide effective shielding against EMP waves. The electromagnetic interference (EMI) resistant cementitious ink includes conductive surfaces to reflect electrically dominant waves and/or absorptive surfaces to reflect magnetically dominant waves. Using 3D printing technology, structures may be built by alternating and/or configuring layers have different material properties. In addition to alternating the layers of material, 3D printing technology also enables the layers to be formed into specific shapes that improves EMI resistance.

In the present application, the EMI-resistant cementitious ink includes taconite material and a conductive material such as a liquid carbon-based nanoparticles solution to provide the EMP resistance. In some embodiments, the EMI-resistant cementitious ink includes fine taconite aggregate, taconite powder, silica sand, and liquid carbon-based nanoparticles in combination with a hydraulic cement, such as Portland cement, calcium carbonate, and water. In one embodiment, the ratio of silica sand to fine taconite aggregate to taconite powder is 2:1:1. In some embodiments, the conductive material may consist of one or more of graphite powder, carbon nanotube particles, micro-steel fibers, carbon nanofiber, or any other suitable material dispersed in water.

The EMI-resistant cementitious ink may also include additional absorptive material such as river or beach sands with magnetite. To make the binders absorptive, ground powder obtained from taconite aggregates along with sand prepared from magnetic material are added to the mixture.

In one embodiment, the cementitious ink includes absorptive materials only. In other embodiments, the cementitious ink includes both absorptive and conductive materials. A liquid-based conductive coating may optionally be applied to all or selective layers of cementitious inks.

In some embodiments, the method of forming the EMI-resistant cementitious ink includes first mixing the dry ingredients of the hydraulic cement, the calcium carbonate, the silica sand, and the taconite components. Water and additives such as a high range superplasticizer are then added to the dry ingredients. After the dry ingredients are mixed with the water and additives, a liquid carbon-based nanoparticle solution is added to the wet mix to produce the EMI-resistant cementitious ink.

Variation of absorptive and conductive materials in the cementitious inks and in the application of the liquid-based conductive coating results in different levels of EMP resistance. For example, a structure that includes the conductive coating has a greater resistance to EMP waves than a structure that does not include the conductive coating. Similarly, a structure formed from a cementitious ink that includes only absorptive material has a mild resistance to EMP waves as compared to a structure formed from a cementitious ink that includes both absorptive and conductive materials.

Conventional 3D printing systems may implement a pumping system, whereby a fluid is required to pass through an extended line of pipe, over substantial lengths and through various gate types, bends, nozzles, and the like. The cementitious mixture needs to be fairly fluid, having a particular viscosity for the given system and its piping. Additive mixtures are used to adjust or modify the viscosity of the cementitious mixture before the cementitious mixture reaches the end of the line (e.g., the nozzle). The cementitious mixture is then extruded from the nozzle as an elongated bead, layer by layer vertically upward to form the wall. The material properties of the cementitious mixture for 3D printing must be of the proper viscosity and can include different dry ingredients such as Portland cement, fly ash, limestone fines, silica fume, sand, gravel mixed with water and other fluid or liquid-based material.

Variation in the shaping and/or layering of the elongated beads of cementitious ink also affects the resistance to EMP waves. The elongated bead formed by the extrusion of cementitious ink from the 3D printing system has a curved outer surface that affects the structure's resistance to EMP waves. Similar to the effect of the radius of curvature of each individual elongated bead on the structure's resistance to EMP waves, an elongated bead (or wrythe of beads) may be formed with a slight curve to affect the resistance as well.

Variation in the wall construction also contributes to the strength of resistance to EMP waves. A wall of a structure may be formed by a first wrythe of linear layers and a second wrythe of linear layers with a third wrythe having a non-linear pattern (such as a zigzag or tacking pattern) formed between the first and second wrythes. The variation of absorptive and conductive materials in the cementitious inks forming each wrythe affects the wall's EMP resistance. For example, a wall may include an outer wrythe formed from a repeated pattern of first and second layers of absorptive material only and a third layer of both absorptive and conductive materials and an inner wrythe formed by alternating and offset layers of a tacking pattern of a cementitious ink having both absorptive and conductive materials. The amount of the absorptive and conductive materials within the different layers, the shaping of the elongated beads, and the geometry of the wrythes contribute to the strength of EMP resistance of the wall structure.

The ability to alternate cementitious inks and/or coatings including different EMP resistant binders or materials and to deposit cementitious inks in varying cross-sectional areas as well as varying planar areas provided by 3D printing of cementitious inks allows for increased and tailored resistance to EMP waves. Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE DRAWINGS

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Figure 1:
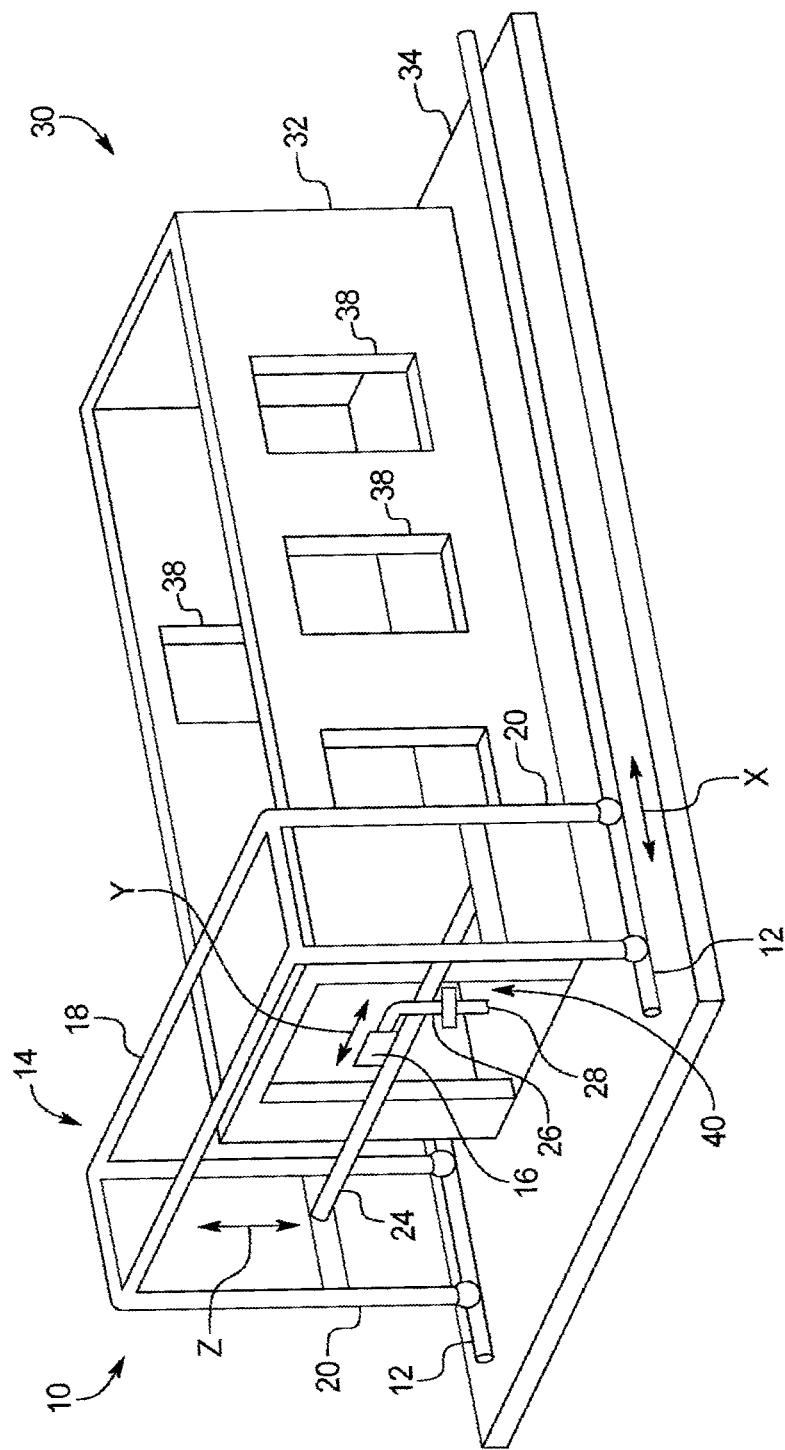
FIG. 1 is a perspective view of a construction system and a building structure being formed by the construction system using printed, stacked layers of elongated beads comprising cementitious ink such as the EMI-resistant cementitious ink of the present application.

The present disclosure provides a cementitious ink having binder mixtures including conductive and absorptive surfaces that may be printed into complex geometric shapes to provide effective shielding against EMP waves. In one embodiment, the EMI-resistant cementitious ink includes taconite material, preferably a fine aggregate taconite and a taconite powder, and a conductive material, such as liquid carbon-based nanoparticles in solution, to improve EMP resistance. Using 3D printing technology, structures may be built by alternating layers that have different material properties and by forming the layers into specific shapes that affect the EMP resistance of the structure.

Conventional 3D printing systems may implement a pumping system, whereby a fluid is required to pass through an extended line of pipe, over substantial lengths and through various gate types, bends, nozzles, and the like. The cementitious mixture needs to be sufficiently fluid, having a particular viscosity to allow for movement through the system. Additives are used to adjust or modify the viscosity of the cementitious mixture before the cementitious mixture reaches the end of the line (e.g., the nozzle). The cementitious mixture is then extruded from the nozzle as an elongated bead, layer by layer vertically upward to form the wall. The material properties of the cementitious mixture for three-dimensional printing must be of the proper viscosity and can include different dry ingredients such as Portland cement, fly ash, limestone fines, silica fume, sand, gravel mixed with water, and other fluid or liquid-based material.

Referring to FIGS. 1-4, a construction system 10 according to one embodiment is shown. Although there are multiple types of 3D additive construction systems contemplated herein, one example of a construction system 10 includes a gantry-type construction system. Construction system 10 can include a pair of railed assemblies 12, a gantry 14 moveably disposed on rail assemblies 12, and a printing assembly 16 moveably disposed on gantry 14. For example, gantry 14 can include a bridge support 18 connected between a pair of vertical supports 20. Also, coupled between vertical supports can be a trolley bridge 24, on which printing assembly is 16 is moveably disposed.

For example, gantry 14 can move in the x-axis or x-direction along rail assemblies 12, and printing assembly 16 can move along the y-axis or y direction along trolley bridge 24. To complete the three orthogonal axes or dimensions of movement for printing assembly 16, trolley bridge 24 can move vertically up and down along the z-axis. For example, trolley bridge 24 can move up and down in the z-axis upon the vertical support members 20. The x-axis is orthogonal to the y-axis and the z-axis is orthogonal to the plane formed by the x and y axes. Movement along the x, y and z-axes of printing assembly 16 can occur via drive motors coupled to drive belts, chains, cables, etc. Controllably from an instruction-driven processor within a peer system or controller.

Construction system 10 effectuates the construction of a building structure 30 by passing the printing assembly 16 above a wall structure 32 and emitting extruded building material from a nozzle 26 comprising an outlet 28. Accordingly, as printing assembly 16 moves in three possible orthogonal axes, as well as angles therebetween, outlet 28 emits extruded building material onto the upper surface of the wall structure 32 as it is being formed. The wall structure is formed layer-by-layer by laying down an elongated bead of cementitious material of cement or concrete beginning with the first layer on ground or a pre-existing foundation 34.

Figure 3:
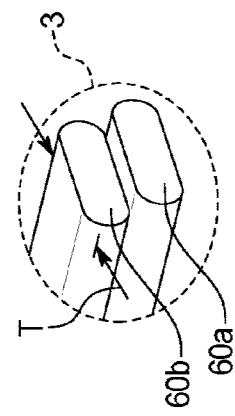
FIG. 3 is expanded breakaway view along region 3 of FIG. 2, showing the elongated beads of the wall structure that, when stacked, form a single wythe wall members of the wall structure.

As each layer of elongated beads are laid down onto the foundation 34 or onto a previous layer, a plurality of stacked elongated beads of extruded building material additively, and three dimensionally, form a building structure 30 (see FIG. 3). When the printing assembly 16, and thereby the outlet 28, approaches an opening such as a window opening 38 or a door opening 40, the pump for the extruded building material stops and a valve on the nozzle 28, or elsewhere on the line, shuts off the flow of extruded material, and does not resume the flow until after the outlet 28 moves past the opening 38, 40 where the wall structure 32 is resumed. Similarly, the printing assembly 16 may shut off flow of extruded material in order to switch cementitious inks and/or nozzles printing different cementitious inks.

Figure 2:
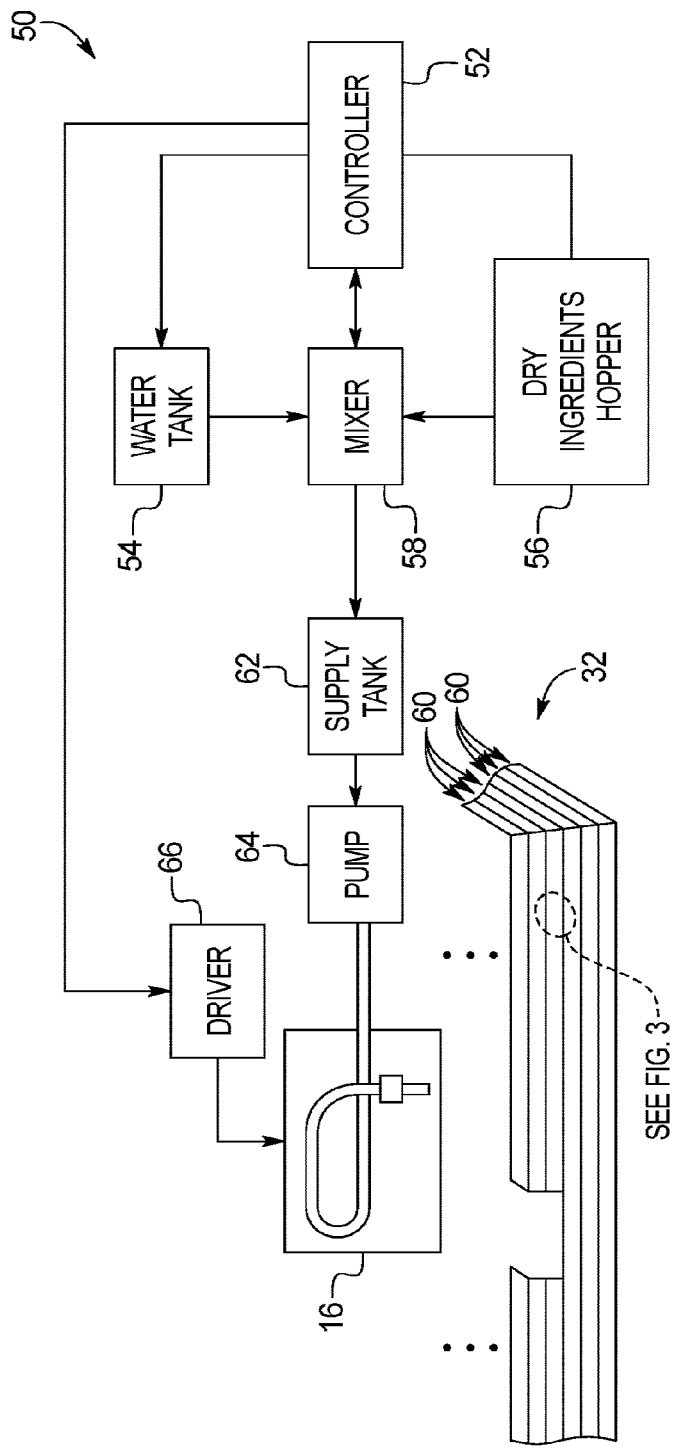
FIG. 2 is a partial front view of the structure shown in FIG. 1, and a block diagram of a control system for controlling the printing of stacked beads that form the wall structure.

Referring to FIG. 2, a control system 50 is shown in block diagram for controlling the printing of the stacked elongated beads 60 of wall structure 32. Control system 50 includes a computer system, or controller 52, that contains memory and an instruction set for adding the proper amount of water or liquid mix material from water tank 54, and dry ingredients from hopper 56 into mixture 58. Possibly through a feedback sense mechanism, controller can adjust the mix of the concrete material and thus the proper proportions of water (or liquid) to dry material, and supply that proper mix to a supply tank 62.

Figure 4:
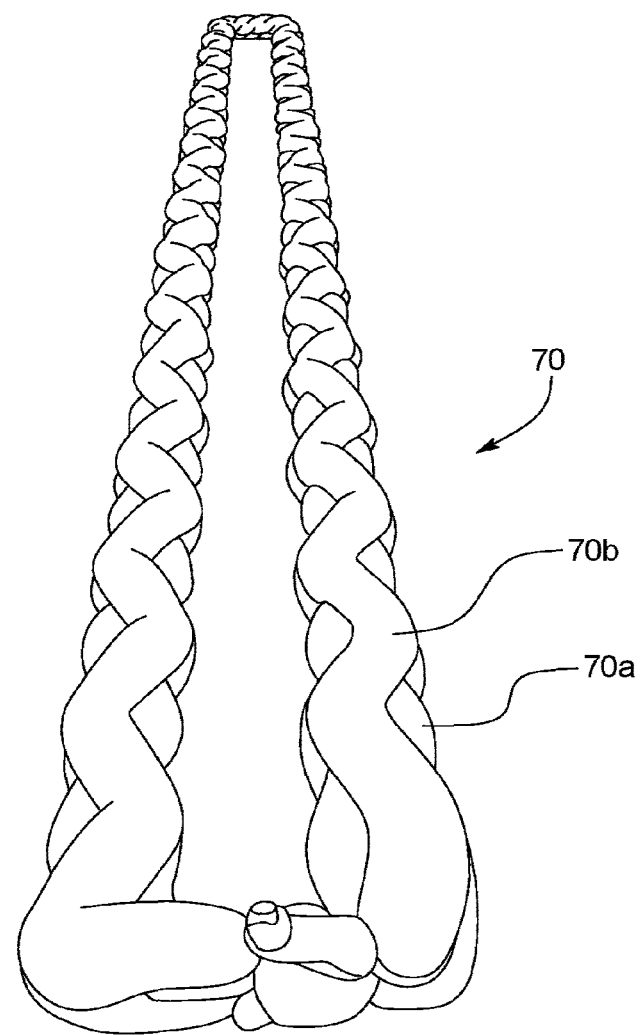
FIG. 4 is a perspective view of a further wall structure formed of elongated beads.

FIG. 3 illustrates an expanded breakaway view along region 3 of FIG. 2. Specifically, FIG. 3 illustrates the elongated beads stacked on top of one another to form a plurality of vertically stacked elongated beads 60. In the example shown, elongated bead 60b is stacked upon elongated bead 60a. As the printing process continues, another elongated bead will be stacked upon bead 60b, and so on. If one bead is stacked upon another bead, then the ensuing wall structure 32 will be one bead width in thickness, labeled T. A wythe is a continuous plurality of vertically stacked elongated beads, and a wythe can be a single wythe of thickness T, or a multiple wythe of multiple thicknesses T depending how many elongated beads are placed adjacent one another during the printing process. Accordingly, a wythe is only one bead width in thickness, whereas a pair of wythes is two bead thickness possibly with a core area spaced between a portion of the pair of wythes. FIG. 4, described in greater detail below, also illustrates the ability of the construction system 10 to form the layers into specific shapes that affect the EMP resistance of the structure.

The particular fluid parameters of the cementitious ink, such as viscosity and/or setting time, can be advantageously controlled, thus optimizing the overall system for 3D printing. For example, lower viscosity cementitious ink is "easier" to pump through tubing; reducing the overall power requirements for pumping the cementitious ink. Higher viscosity cementitious ink is "easier" to 3D print; improving 3D printing accuracy and reducing the required setting time between layers of 3D printing. At least for these reasons, the systems herein provide for control of cementitious ink in the 3D printing process, including specific control of the viscosity of the cementitious ink and the capability to dynamically adjust the viscosity of the cementitious ink during 3D printing by controlling the injection of additive mixtures.

Further, the cementitious ink of the present application includes EMP resistant binders for EMI shielding. In one embodiment, the ink includes taconite, preferably a combination of fine taconite aggregates and taconite powder, and a conductive material, such as liquid carbon-based nanoparticles in solution, to provide the EMP resistance. The absorptive material may include river or beach sands with magnetite in addition to the fine taconite aggregate. To make the binders absorptive, fine taconite aggregates and ground powder obtained from taconite aggregates along with the silica sands are added to the Portland cement and calcium carbonate mixture.

In some embodiments, the EMI-resistant cementitious ink includes fine taconite aggregate, taconite powder, silica sand, and liquid carbon-based nanoparticles in combination with Portland cement, calcium carbonate, and water. Additives or admixtures such as a superplasticizer may be included as needed or desired.

In one embodiment, the cementitious ink comprises Portland cement, calcium carbonate, silica sand, taconite, liquid carbon-based nanoparticles in solution, and water. The cementitious ink may include about 25% to about 30% by weight of the silica sand, about 30% to about 35% by weight of the combination of taconite powder and fine taconite aggregates, and about 20% to about 30% by weight of the Portland cement and calcium carbonate. The remaining balance of about 5% to about 25% by weight comprises a mixture of the liquid carbon-based nanoparticles solution with water, preferably in a ratio of about 1:4. The cementitious ink may also include additives or admixtures as well.

In a preferred embodiment, the ratio of silica sand to taconite material is about 1:1. The taconite material preferably includes fine taconite aggregate and ground taconite powder at a ratio of about 1:1. The ratio of silica sand to fine taconite aggregate to taconite powder is about 2:1:1.

Figure 5:
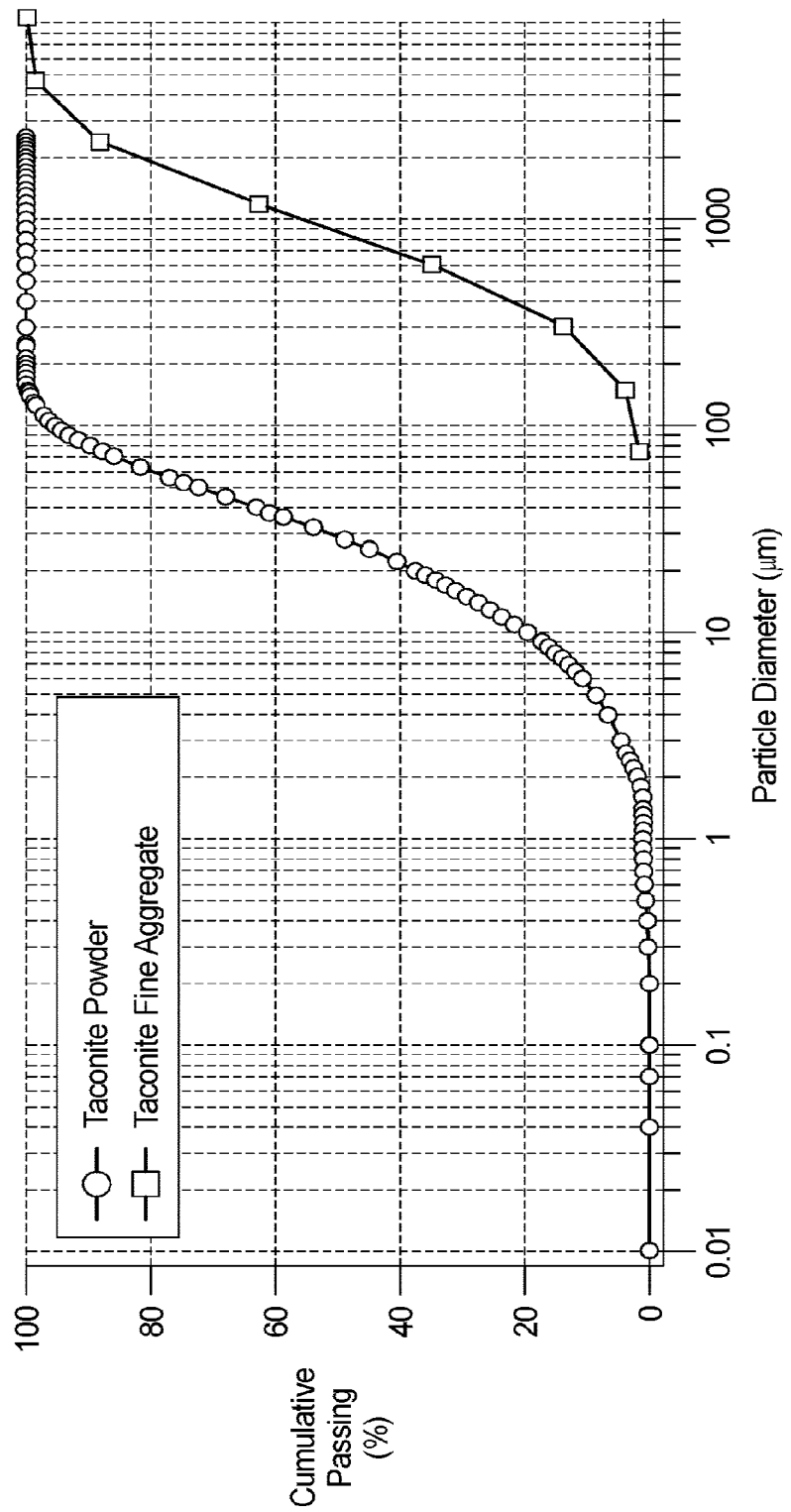
FIG. 5 is a graph demonstrating exemplary particle size distributions of taconite powder and fine taconite aggregate used in the EMI-resistant cementitious ink of the present application.

FIG. 5 illustrates exemplary particle size distribution curves of the fine taconite aggregate and the taconite powder. Table 1 below provides the diameter information of the particle size distribution. Each of $d_{90}$, $d_{50}$, and $d_{10}$ corresponds to a diameter of which 90%, 50%, and 10%, respectively, of the total volume of the particles in a sample is less than or equal to. In the illustrated example particle size distributions, the fine taconite powder has a mean particle size of 38 µm, while the fine taconite aggregate has a mean particle size of 910 µm, although the mean particle size may vary. The relative density of the taconite-based fine aggregate and powder is 2.94 and 4.81 (oven-dry), respectively.

TABLE 1

Particle size information

|  | Taconite Powder | Fine Taconite Aggregate |
|---|---|---|
| $d_{90}$ | 80 μm | 2,700 μm |
| $d_{50}$ | 38 μm | 910 μm |
| $d_{10}$ | 6 μm | 242 μm |

An example chemical composition of taconite aggregate is provided in Table 2 below, although other samples of taconite aggregate may include variations to the chemical composition provided below. Taconite aggregate has a substantial amount of quartz mixed with other forms of iron oxides and hydrated magnesium silicate.

TABLE 2

Example Chemical Composition for Taconite Aggregate

| Chemical Name | Chemical Formula | Concentration (% by weight) |
|---|---|---|
| Crystalline Silica (Quartz) | $SiO_2$ | >50 |
| Hematite | $Fe_2O_3$ | 6-15% |
| Siderite | $FeCO_3$ | 4-7% |
| Magnetite | $Fe_3O_4$ | 2-4% |
| Goethite | $\alpha\text{-FeO(OH)}$ | 1-3% |
| Talc | $Mg_3Si_4O_{10}(OH)_2$ | <8 |

The chemical composition of taconite changes when the taconite aggregate is ground into a fine powder, reducing the amount of impurities, such as silica and magnesium, and increasing the concentration of iron. An example of the chemical composition of the taconite powder is provided in Table 3 below, although other samples of taconite powder may include variations to the chemical composition provided below.

TABLE 3

Example Chemical Composition for Taconite Powder

| Chemical Name | Chemical Formula | Concentration (% by weight) |
|---|---|---|
| Hematite | $Fe_2O_3$ | 66.0-69.0 |
| Iron oxide | FeO | 26.0-28.0 |
| Crystalline Silica (Dioxosilane) | $SiO_2$ | 4.0-4.5 |
| Crystalline Silica (Quartz) | $SiO_2$ | 2.5-3.2 |
| Magnesium Oxide | MgO | 0.1-0.3 |
| Calcium Oxide | CaO | 0.1-0.2 |
| Manganese | Mn | ≤0.1 |

Iron oxide is often produced as a waste material or byproduct in the construction industry. As iron oxide is a large component of taconite aggregate, the EMI-resistant cementitious ink of the present application enables a redirection of iron oxide as a waste material to be landfilled into a secondary resource in the production of the cementitious ink having EMP resistance.

Silica sand having a particle size ranging between about 75 μm to 4,750 μm is commonly used in cement mixtures. In the present EMI-resistant cementitious ink, silica sand had a particle size ranging from 15 μm to 1,700 μm.

In some embodiments, the conductive material includes carbon-based nanoparticles such as one or more of multi-walled or single-walled carbon nanotube particles, carbon nanofiber particles, graphene particles, graphite particles, carbon black and amorphous carbon particles, nanodiamonds, and fullerene particles. The nanocarbon particles are dispersed in a mixture of water with a surfactant that enables the nanocarbon particles to remain dispersed. Additional admixtures may be used in combination with the water and surfactant to improve the suspension, deagglomeration, and/or stability of the nanocarbon particles in solution. Liquid carbon-based nanoparticles are generally known in the industry and are commercially available.

In one embodiment, the EMI-resistant cementitious ink may include about 5% to about 25% by weight of a mixture of liquid carbon-based nanoparticles in solution and water, preferably having a ratio of the carbon-based nanoparticles solution to water of about 1:4.

As described in greater detail herein, the liquid carbon-based nanoparticles solution is added after at least about one to two minutes of mixing the dry components with water. In some embodiments, adding the carbon-based nanoparticles in powder form and/or to the dry components prior to adding water is not sufficiently effective in increasing electromagnetic shielding. In other embodiments, carbon nanowires and/or carbon nanofibers may be used instead of or in addition to liquid carbon-based nanoparticles.

In one embodiment, the cementitious ink includes absorptive materials only. In other embodiments, the cementitious ink includes both absorptive and conductive materials. A liquid-based conductive coating may optionally be applied to all or selective layers of cementitious inks.

Figure 6:
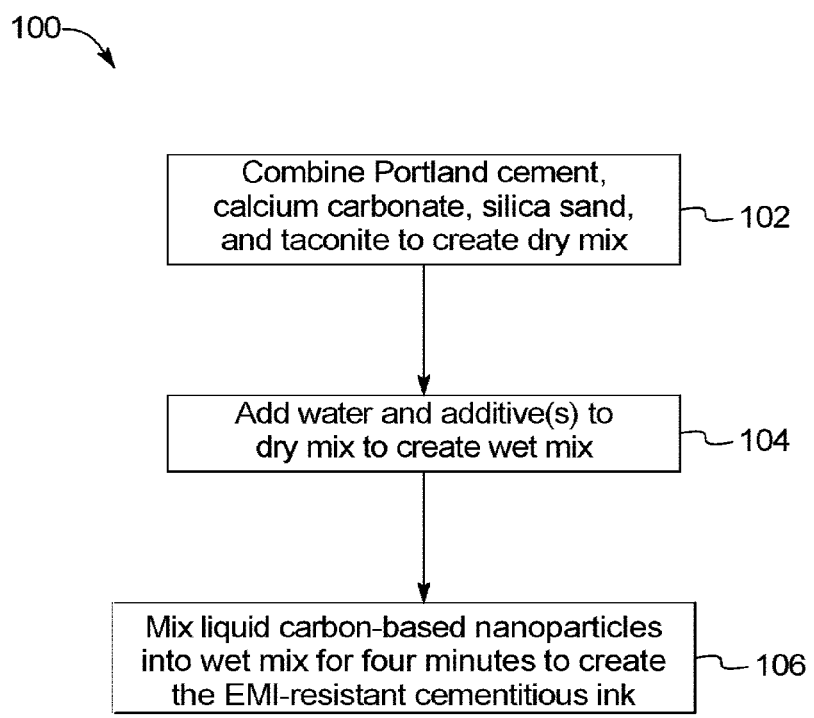
FIG. 6 is a flow diagram of an exemplary method of producing the EMI-resistant cementitious ink according to the present application.

FIG. 6 describes a method 100 of producing an EMI-resistant cementitious ink of the present application. In a first step 102, a dry mix of Portland cement, calcium carbonate, silica sand, and taconite is prepared. Water and additives, such as a retarder, a high range superplasticizer, an air entrainer, and a shrinkage reducing admixture, are added to the dry mix to form a wet mix in step 104.

After the dry ingredients are mixed with water, the liquid carbon-based nanoparticles solution is added to the wet mix in step 106. In some embodiments, the carbon-based nanoparticles solution is added after at least one to two minutes of mixing the dry ingredients with water. In one embodiment, the EMI-resistant cementitious ink is ready for use after approximately four minutes of mixing.

Testing was undertaken on samples having varying amounts of silica sand, powder taconite, and fine taconite aggregate. The variation in amounts of the dry ingredients between three samples, including a control sample and two sample mixes, is provided in Table 4 below. In addition to the components listed in Table 4, each of the Control Sample, Sample Mix 1, and Sample Mix 2 included approximately about 20% by weight Portland cement and about 20% by weight calcium carbonate. The dry ingredients were then mixed with water and the liquid carbon-based nanoparticles solution prior to testing.

TABLE 4

Sample information

|  | Control Sample | Sample Mix 1 | Sample Mix 2 |
|---|---|---|---|
| Silica sand | 60% by weight | 25% by weight | 25% by weight |
| Taconite Powder | None | None | 17.5% by weight |
| Fine Taconite Aggregate | None | 35% by weight | 17.5% by weight |

Figure 7:
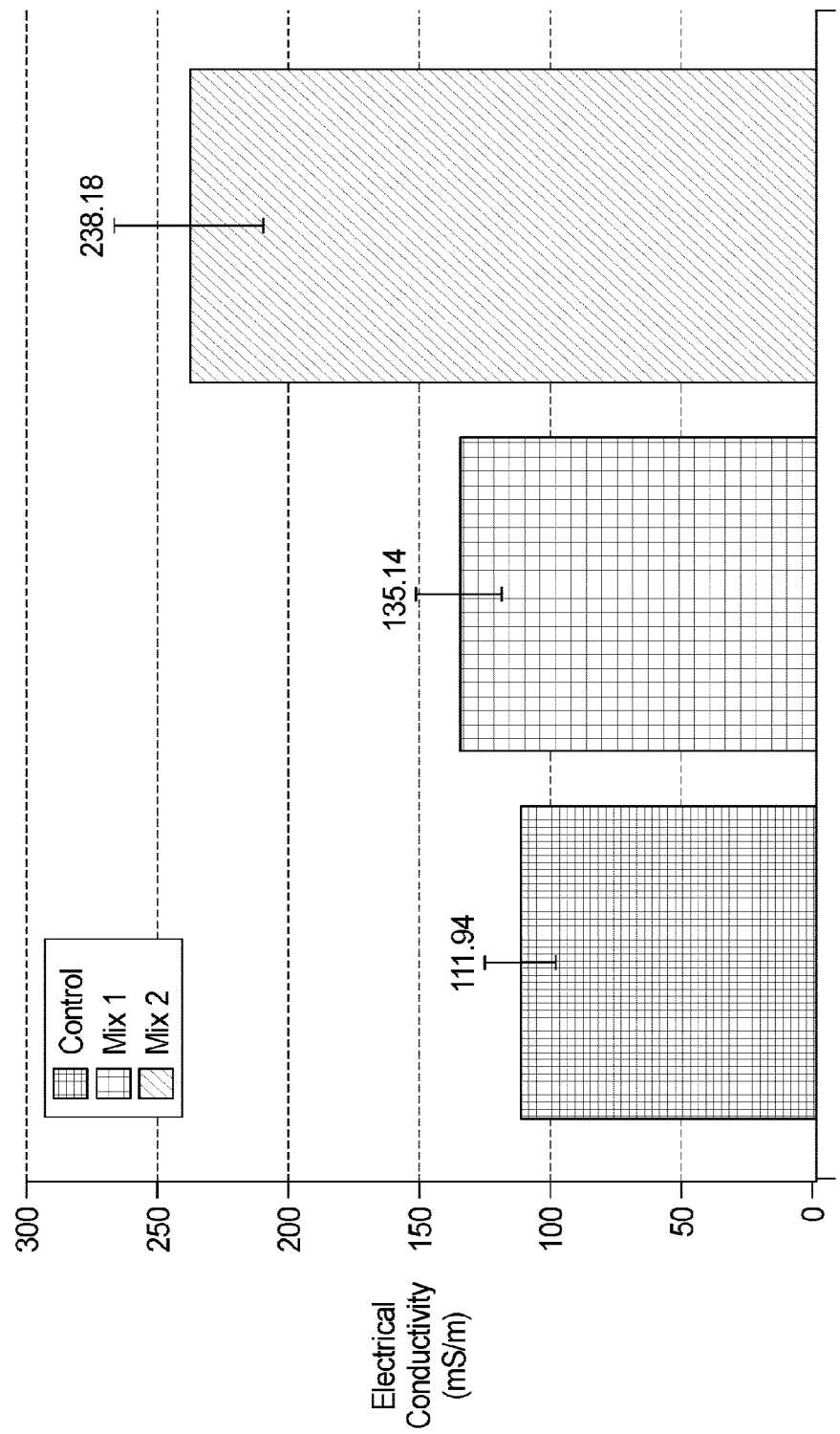
FIG. 7 is a chart illustrating electrical conductivity of samples including the EMI-resistant cementitious ink of the present application.

FIG. 7 illustrates the results of a test for electrical conductivity using a four-wire method. The four-wire method measures electrical conductivity using an LCR meter, which measures the inductance (L), capacitance (C), and the resistance (R) of each specimen. For each sample proportion, three specimens were evaluated at a frequency of 10 kHz.

The electrical conductivity was calculated as follows:

$$\sigma\left(\frac{s}{m}\right) = \frac{1}{\rho} = \frac{L}{RA}$$

where σ is the electrical conductivity $\left(\frac{s}{m}\right)$, ρ is the electrical resistance (Ω·m), R is the electrical resistance (Ω), A is the cross-sectional area of the composite between the electrodes (m²), and L is the distance between the electrodes.

The results of the testing are shown in FIG. 7. The electrical conductivity of Sample Mix 2 is approximately 1.76 times the electrical conductivity of Sample Mix 1. As Sample Mix 1 includes no taconite powder and Sample Mix 2 includes an equal amount of fine taconite aggregate and taconite powder, the improvement of electrical conductivity results from the use of taconite powder with fine taconite aggregate in the EMI-resistance cementitious ink.

Figure 8:
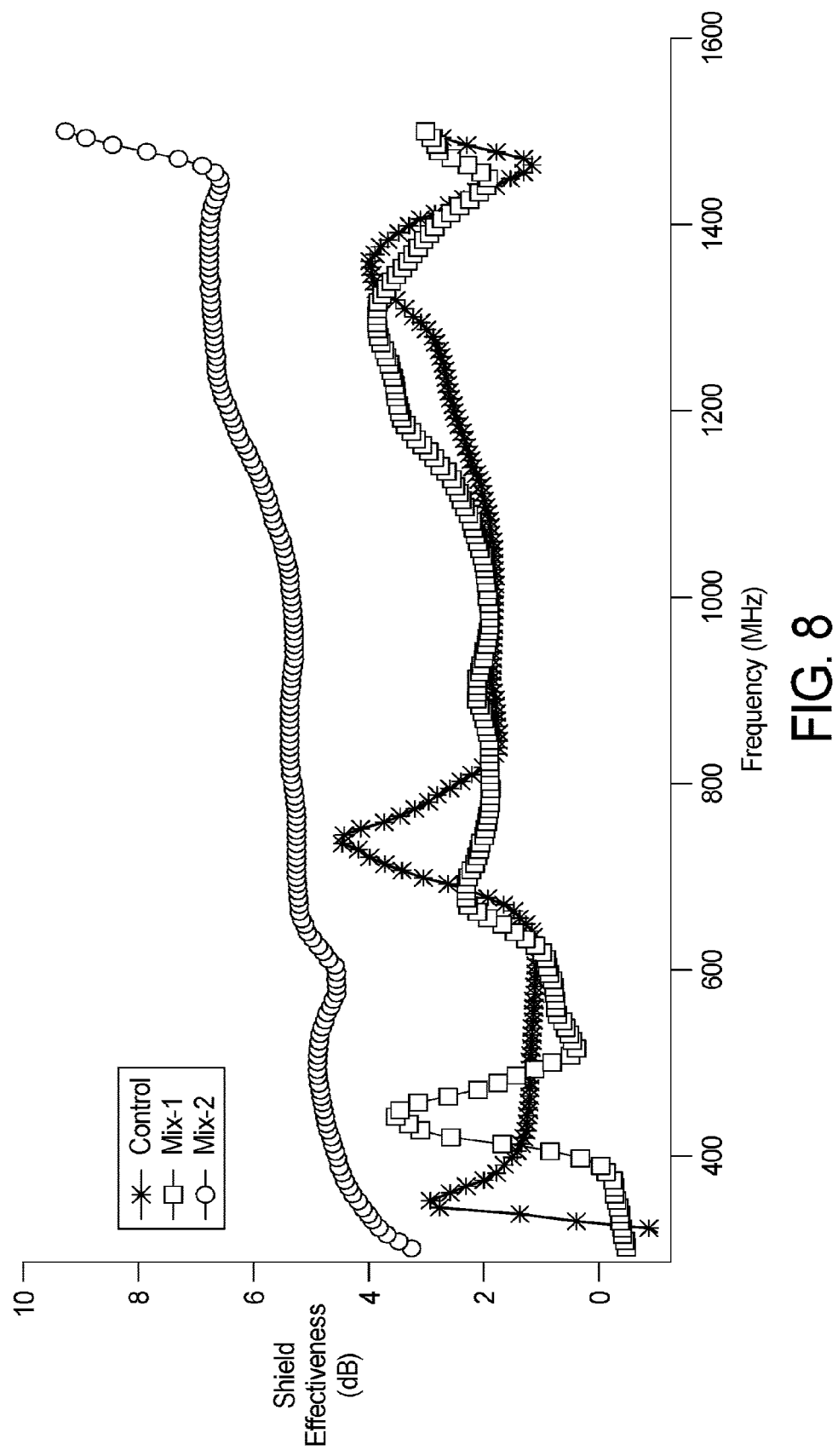
FIG. 8 is a graph illustrating the shielding effectiveness of samples including the EMI-resistant cementitious ink of the present application.

FIG. 8 illustrates the results of a test for EMI shielding effectiveness in accordance with ASTM D4935-18, the standard test method for measuring the electromagnetic shielding effectiveness (SE) of planar materials. SE is a measurement of the difference in an electromagnetic field with and without the protective, EMI-resistant materials. EMI SE was performed in the frequency range of 30 Mhz to 1600 MHz. The SE (in decibels, dB) was calculated from the following ratio:

$$SE(\text{dB}) = 10\log(P_1/P_2)$$

where $P_1$ is the power received with the material present and $P_2$ is the power received without the material present.

Referring to FIG. 8, Sample Mix 1 and the Control Sample exhibited shielding effectiveness between about 1 and about 2 dB, indicating poor electrical conductivity. Sample Mix 2 showed a steady rise in shielding effectiveness greater than 4.0 dB and up to about 6.0 dB. The positive values indicated increased shielding effectiveness, suggesting that more current is blocked.

As noted above, variation of absorptive and conductive materials in the cementitious inks and application of the liquid-based conductive coating results in different levels of EMP resistance. A structure that includes the conductive coating has a greater resistance to EMP waves than a structure that does not include the conductive coating. Similarly, a structure formed from a cementitious ink that includes only absorptive material has a mild resistance to EMP waves as compared to a structure formed from a cementitious ink that includes both absorptive and conductive materials.

The conductive material may be added to the wet mix via a nozzle onto selected layers in the subsequent step to form a conductive material that is absorptive and conductive. More specifically, the conductive material may be deposited on the 3D printed layer's surface through an additional outlet at the nozzle during the printing process. Conductive materials may be dosed in liquid and be applied to specific layer surfaces. The conductive coating may have a polymeric liquid base.

Referring again to FIG. 4, the shaping of the elongated beads of cementitious ink also affects the resistance to EMP waves. The elongated bead formed by the extrusion of cementitious ink from the 3D printing system has a curved outer surface that affects the structure's resistance to EMP waves. A smaller radius of curvature of the beads results in a greater total surface area of the structure, increasing the exposure area of the area of the structure and thereby increasing the resistance to EMP waves. The elongated bead (or wrythe of beads) may be formed with a slight curvature to affect resistance as well.

Variation in the wall construction also contributes to the strength of resistance to EMP waves. In the elongated beads 70 of FIG. 4, the uppermost layer 70a includes absorptive surface, while an intermediate layer 70b includes conductive surfaces. In other embodiments, a wall of a structure may be formed by a first wrythe of linear layers and a second wrythe of linear layers with a third wrythe having a non-linear pattern (such as a zigzag or tacking pattern) formed between the first and second wrythes. The variation of absorptive and conductive materials in the cementitious inks forming each wrythe affects the wall's EMP resistance. For example, a wall may include an outer wrythe formed from a repeated pattern of first and second layers of absorptive material only and a third layer of both absorptive and conductive materials and an inner wrythe formed by alternating and offset layers of a tacking pattern of a cementitious ink having both absorptive and conductive materials. The amount of the absorptive and conductive materials within the different layers, the shaping of the elongated beads, and the geometry of the wrythes contribute to the strength of EMP resistance of the wall structure.

As used in this specification, including the claims, the term "and/or" is a conjunction that is either inclusive or exclusive. Accordingly, the term "and/or" either signifies the presence of two or more things in a group or signifies that one selection may be made from a group of alternatives.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed:

1. A method of forming an electromagnetic interference ("EMI") resistant cementitious ink comprising:
   combining a hydraulic cement, calcium carbonate, silica sand, and taconite material to form a dry mix;
   adding water to the dry mix to form a wet mix; and
   adding a carbon-based nanoparticles solution to the wet mix to form the EMI-resistant cementitious ink,
   wherein the water is mixed with the dry mixture for at least about one minute before the carbon-based nanoparticles solution is added to the wet mixture.

2. The method of claim 1, wherein the taconite material includes taconite powder and fine taconite aggregate.

3. The method of claim 2, wherein a ratio of taconite powder to fine taconite aggregate is 1:1.

4. The method of claim 1, wherein the EMI-resistant cementitious ink has a shielding effectiveness in accordance with ASTM D4935-18 of at least about 4.0 dB.

5. The method of claim 1, further comprising:
adding one or more of carbon nanowires and carbon nanofibers to the liquid carbon-based nanoparticles.

6. The method of claim 1, wherein adding the water to the dry mix to form the wet mix further comprises:
adding additives including one or more of a superplasticizer, an air entrainer, and a shrinkage reducing admixture.

* * * * *